June 28, 1960    F. C. BADALICH    2,942,365
SLIDE TRAY CONSTRUCTION
Filed Feb. 21, 1957    3 Sheets-Sheet 1

INVENTOR.
Frank C. Badalich
BY
Robert R. Lockwood
Atty

June 28, 1960  F. C. BADALICH  2,942,365
SLIDE TRAY CONSTRUCTION
Filed Feb. 21, 1957  3 Sheets-Sheet 2
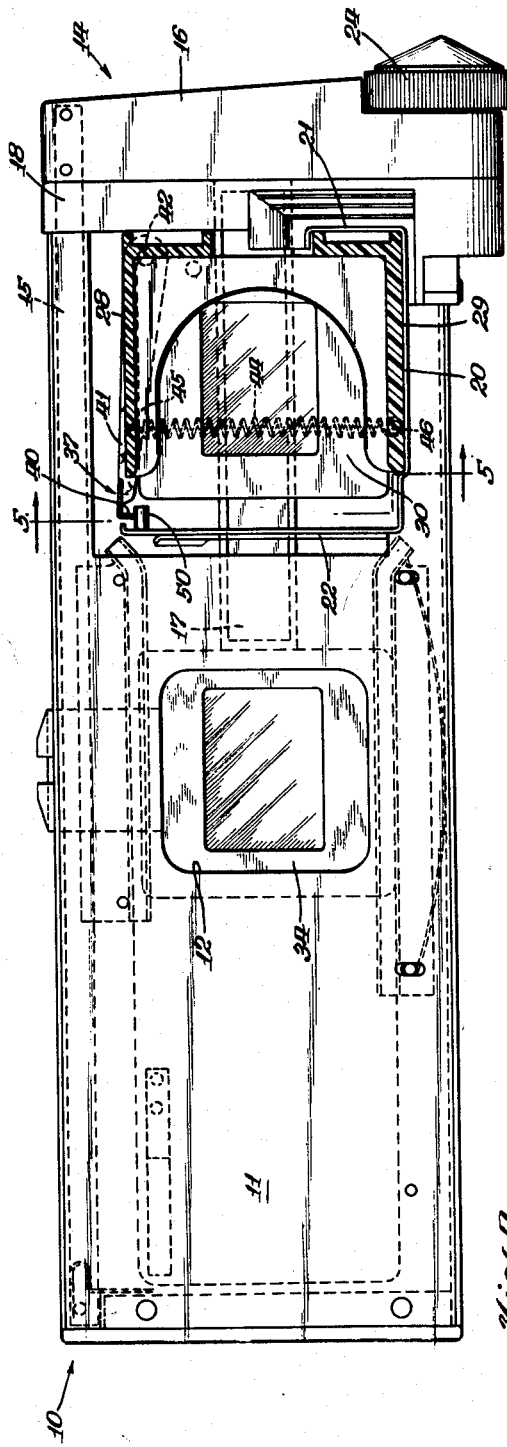
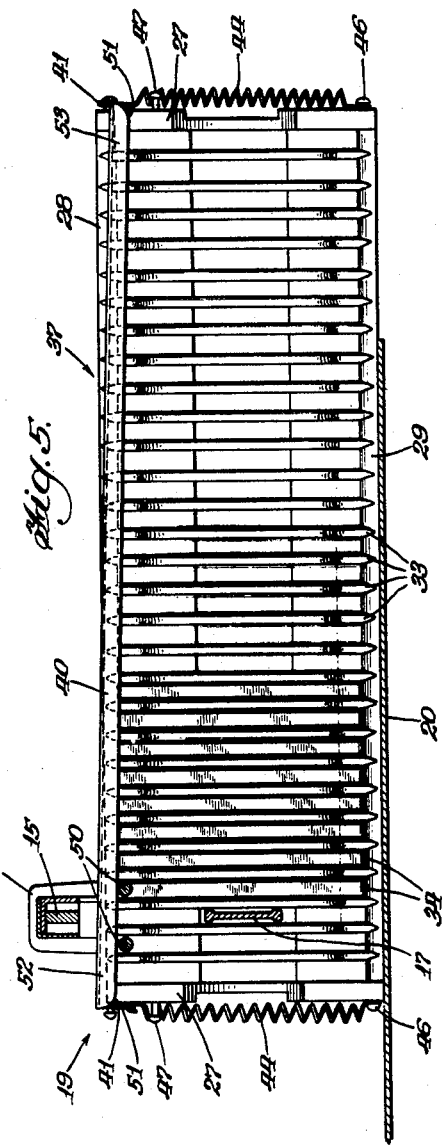
INVENTOR.
Frank C. Badalich
BY
Robert R. Lockwood
Atty.

June 28, 1960 F. C. BADALICH 2,942,365
SLIDE TRAY CONSTRUCTION
Filed Feb. 21, 1957 3 Sheets-Sheet 3
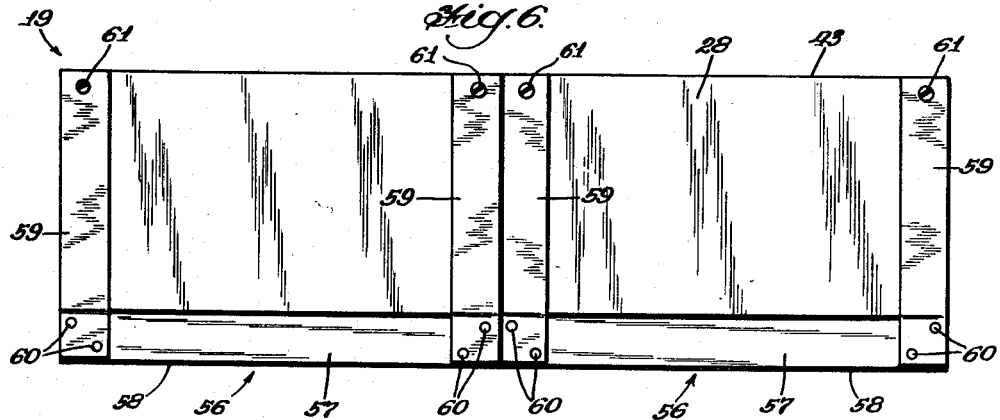
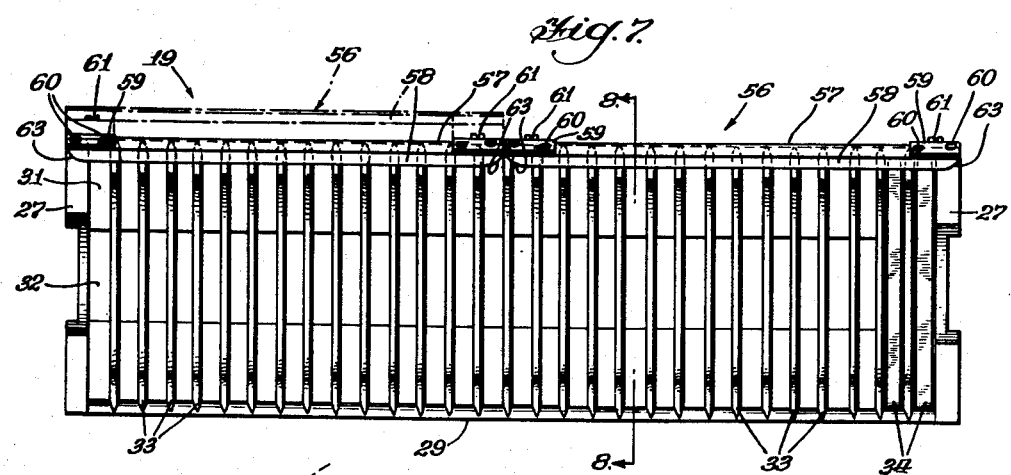
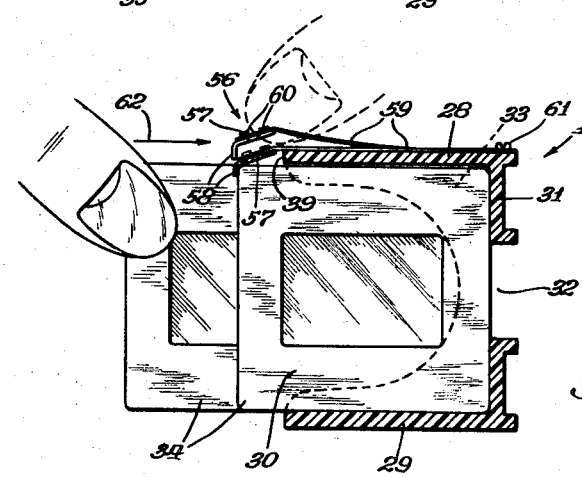
INVENTOR.
Frank C. Badalich
BY
Robert R. Lockwood
Atty.

United States Patent Office 2,942,365
Patented June 28, 1960

2,942,365

SLIDE TRAY CONSTRUCTION

Frank C. Badalich, Chicago, Ill., assignor to Bell & Howell Company, Chicago, Ill., a corporation of Illinois Filed Feb. 21, 1957, Ser. No. 641,616

2 Claims. (Cl. 40—79)

This invention relates, generally, to devices for carrying slides for stereopticon projectors and it has particular relation to the construction of slide trays. It constitutes an improvement over the invention disclosed in application Serial No. 580,875, filed April 26, 1956.

Among the objects of this invention are: To provide simple, efficient and economical means for holding slides in a slide tray which will permit withdrawal of the slides when desired; to mount the slide holding means about a fixed axis remote from the side of the tray through which the slides are inserted and withdrawn; to position the slide holding means wholly beyond the top wall of the slide tray; to construct the slide holding means and mounting therefor in such manner as to permit the withdrawal of the slides from one end of the tray while they are held in place at the other end; and to employ a two part slide holder with each part being individually resiliently mounted and biased downwardly.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which will be indicated in the appended claims.

For a complete understanding of the nature and scope of this invention reference can be had to the following detailed description, taken together with the accompanying drawings, in which:

Figure 4 is a view, partly in side elevation and partly in section, showing the slide changer and the manner in which the tray full of slides is mounted therein with the slide retaining member raised to permit slides to be moved out of the tray into viewing position and then back into the tray;

Figure 5 is a vertical sectional view taken generally along the line 5—5 of Figure 4;

Figure 6 is a top plan view of a modified form of slide retaining means for a slide tray;

Figure 7 is a view, in front elevation, of the slide tray shown in Figure 6, one of the slide retaining members being shown by broken lines in raised position to permit the application or withdrawal of slides; and Figure 8 is a vertical sectional view taken generally along the line 8—8 of Figure 7 and showing how one of the slide retaining members is lifted to permit the entrance of a slide while the other slide retaining member remains in the retaining position.

Figure 1:
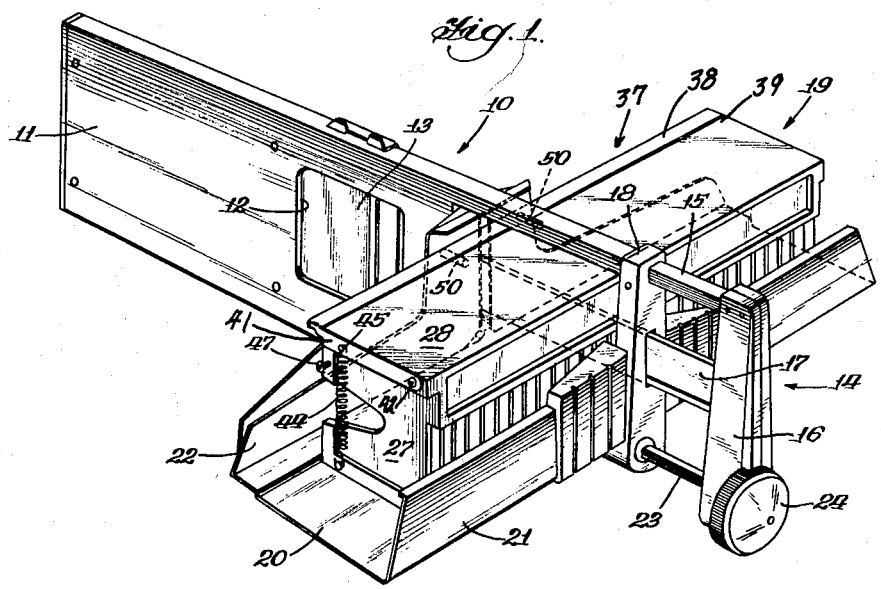
Figure 1 is a perspective view of a slide changer and accompanying slide tray in which the present invention is embodied.

Referring now particularly to Figures 1 and 4 of the drawings, it will be observed that the reference character 10 designates, generally, a slide changer which is of the general construction in U.S. Patent No. 2,724,989, issued November 29, 1955. Accordingly, only a general description of the slide changer 10 will be set forth herein with particular reference to its modification for use with the present invention.

The slide changer 10 includes a frame 11 which is arranged to be mounted in a stereopticon projector. It is provided with an aperture 12 through which a light beam is projected for viewing purposes. A shutter 13 is slidably mounted within the frame 11 for closing the aperture 12 in the absence of a slide. The slides are moved into and out of viewing position by means of a yoke, shown generally at 14, which includes a guide arm 15 that is connected by a cross-head 16 to a pusher arm 17. As described more fully in the patent above referred to, the guide arm 15 extends into the frame 11 and is employed, in addition to guiding the yoke 14, to return the shutter 13 to the closed position when a slide is returned from the viewing position. The pusher arm 17 acts on the slides, one by one, to move them into viewing position. The guide arm 15 and pusher arm 17 extend through an end plate 18, which, together with the frame 11, are employed to slidingly support a tray, shown generally at 19, in a tray holder 20 which is provided with side walls 21 and 22 for guiding the tray 19 therealong. The tray 19 is provided with a longitudinally extending rack (not shown) with which a pinion (also not shown) cooperates to move the tray 19 along the tray holder 20 in order to position the slides, one by one, in registry with the pusher arm 17. The pinion is carried by a shaft 23 which is rotated by a knob 24 for effecting the movement of the tray 19 as described.

Figure 2:
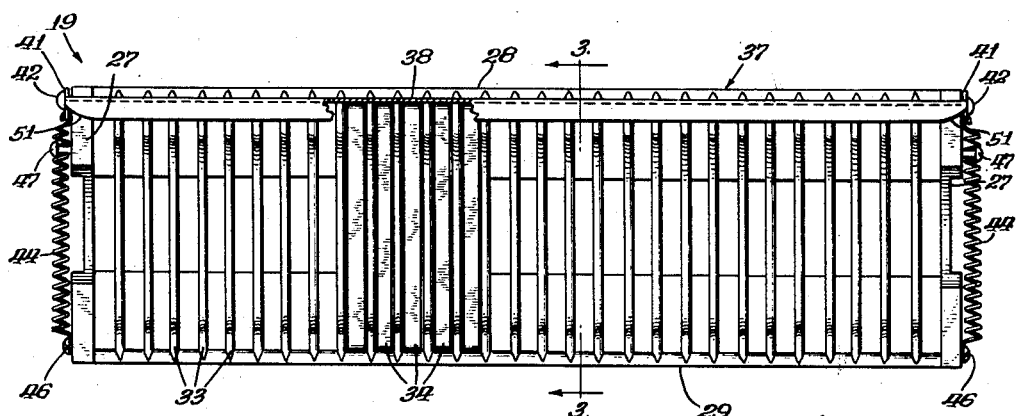
Figure 2 is a view, in front elevation, of the slide tray shown in Figure 1, a portion of the lip of the slide retaining member being broken away in order to illustrate the details of construction.
Figure 3:
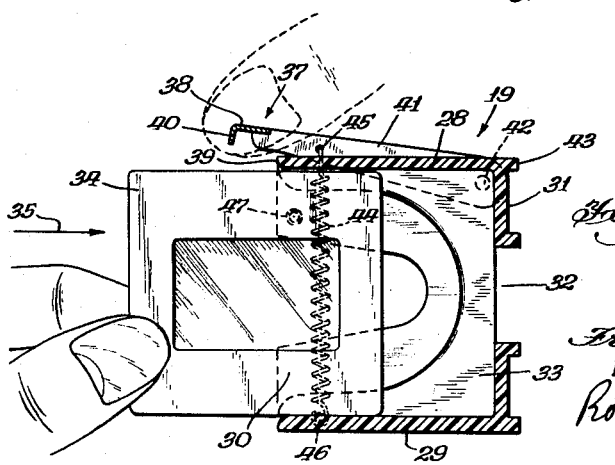
Figure 3 is a vertical sectional view taken generally along the line 3—3 of Figure 2 and showing how the slides are inserted into the tray when the slide retaining member is lifted.

The details of construction of the tray 19 are illustrated more clearly in Figures 2, 3 and 5 of the drawings. The tray 19 may be formed of a thermosetting material, such as a phenolic condensation product, by a suitable molding process. It has ends 27 which serve to interconnect a top wall 28 and a bottom wall 29. Between these walls is an open side 30 with the opposite side 31 partially closed and provided with a longitudinally extending slot 32 through which the pusher arm 17 can project for engaging the slides. This arrangement provides the tray 19 with a generally rectangular cross-section. Formed integrally with the top and bottom walls 28 and 29 and the partially closed side 31 are generally U-shaped septums 33 which serve to hold slides 34 in parallel spaced relation. The tray 19 may be so arranged and constructed as to hold some thirty slides 34. This has been found to be a convenient number.

The slides 34, as shown in Figure 3, are inserted into the tray 19 through the open side 30 in the direction indicated by the arrow 35. Since it is necessary to leave the side 30 open to permit insertion and removal of the slides 34, care must be taken to prevent the slides from falling out of the slide tray 19 while it is being handled, such as while it is being inserted into operative position in the slide changer 10 or removed therefrom.

In accordance with this invention the slides 34 are held in the slide tray 19 against inadvertent escape therefrom by means of a slide retaining member that is indicated, generally, at 37. The slide retaining member 37 preferably comprises an elongated somewhat flexible metallic strip 38 which is positioned wholly beyond the front edge 39 of the top wall 28. The slide retaining member 37 has an integrally formed depending lip 40 which is arranged, as shown more clearly in Figures 2 and 5, to overlie the outer edges of the slides 34 and thus prevent their movement out of the tray 19 unless the lip 40 is raised to the position shown in Figure 3.

The slide retaining member 37 is rockably mounted on the slide tray 19 by means of arms 41 which may be formed integrally with the strip 38. The arms 41 are pivoted at 42 to the ends 27 of the slide tray 19 along and somewhat below and forwardly of the rear edge 43 of the top wall 28. It is desirable to bias the slide retaining member 37 into slide holding position. For this purpose coil tension springs 44 are employed. At their upper ends the springs 44 are connected to the arms 41 by insertion in apertures 45 therein. At their lower ends the springs 44 are secured to pins 46 positioned along the bottom edges of the ends 27. In order to limit the downward movement of the slide retaining member 37 in the absence of one or more of the slides 34 pins 47 are mounted on the ends 27 below the arms 41. In the absence of any of the slides 34, the arms 41 engage the pin 47 and are held thereagainst by the remaining tension in the springs 44.

The slides 34 are inserted in the slide tray 19, as shown in Figure 3, by raising the slide retaining member 37 and inserting them one by one in the direction indicated by the arrow 35. When the tray 19 has been filled, the slide retaining member 37 is released and the lip 40 overlies the outer edges of the slides 34 so that they cannot escape even though the tray 19 is turned to a position where the open side 30 faces downwardly.

In order to automatically raise the slide retaining member 37 when the tray 19 is placed on the tray holder 20 and the slides 34 are to be positioned one by one in registry with the aperture 12, detents 50, Figure 1, are positioned on the side wall 22 of the tray holder 20 for underlying the lower edge of the lip 40. Entry onto one or the other of the detents 50 is facilitated by upwardly curved ends 51 of the lip 40 as shown in Figures 2 and 5. Since the slides 34 cannot be removed from the tray 19 while it is in the tray holder 20, the lifting of the slide retaining member 37 by the interaction with the detents 50 does not permit inadvertent removal.

As shown in Figure 5 the construction of the silde retaining member 37 together with the arms 41 pivoted at 42 is such as to permit one end 52 to be raised by the detents 50 while the other end 53 remains in overlying position with respect to the slides 34 of that end of the tray 19. As the tray 19 moves along relative to the detents 50, the slide retaining member 37 is moved wholly out of overlying retaining engagement with the slides 34 and then, as the movement continues from right to left, as viewed in Figure 5, the end 52 tilts into overlying retaining relation with respect to the slides 34 at the left hand end of the tray 19 while the other end 53 is raised.

As pointed out above another embodiment of the invention is illustrated in Figures 6, 7 and 8 of the drawings. As there shown the same slide tray 19 is employed. Here two slide retaining members, each indicated generally at 56, are employed. Each one extends one half of the length of the tray 19. Each slide retaining member 56 is formed of an elongated flexible metallic strip 57 having an integrally formed downwardly extending lip 58 to overlie the outer edges of the slides 34, as shown in Figure 8. Each slide retaining member 56 is individually mounted for rocking movement about a fixed axis which extends along the rear edge 46 of the top wall 28 by resilient arms 59. The resilient arms 59 overlie the top wall 28 and at their forward ends are secured by rivets 60 to the respective slide retaining member 56. At their rear ends resilient arms 59 are secured to the top wall 28 by screws 61.

As shown in Figure 8, the slides 34 are inserted into the slide tray 19 by lifting the one or the other of the slide retaining members 56. The slides are inserted in the direction indicated by the arrow 62.

Each end of the lip 58 of each slide retaining member 56 is curved as indicated at 63 in order to facilitate cooperation with the detents 50 when the tray 19, loaded with slides, is placed on the tray holder 20 and is moved therealong for projecting the slides in the manner described.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A slide carrying tray comprising, in combination; an elongated tray having a rectangular cross section, open at one side, and top and bottom walls interconnected by septums to hold slides in spaced relation for movement from and to the tray through said one side by slide changing means; slide retaining means extending along and beyond the edge of said top wall adjacent said open side having a depending lip for overlying slides to prevent removal thereof, and resilient arm means secured at one end to each end of said slide retaining means and extending transversely across said top wall and secured adjacent the opposite edge thereof, said resilient arm means biasing said slide retaining means downwardly and permitting upward swinging movement thereof together with said lip and withdrawal of slides from the tray.

2. The invention as set forth in claim 1 wherein the slide retaining means comprises two slide retaining members each carried by resilient arm means at each end.

References Cited in the file of this patent

UNITED STATES PATENTS

| 1,056,835 | Robbins | Mar. 25, 1913 |
| 2,711,602 | Wiklund | June 28, 1955 |

FOREIGN PATENTS

| 319,726 | Germany | Mar. 27, 1920 |
| 608,164 | Germany | Oct. 16, 1931 |